July 8, 1924.

J. A. HEIDBRINK

ANÆSTHETIZING APPARATUS

Filed Nov. 17, 1921

1,500,614

6 Sheets-Sheet 1

INVENTOR
JAY A. HEIDBRINK.
BY Whiteley and Ruckman
ATTORNEYS.

July 8, 1924.

J. A. HEIDBRINK

ANÆSTHETIZING APPARATUS

Filed Nov. 17, 1921  6 Sheets-Sheet 2

1,500,614

INVENTOR:
JAY A. HEIDBRINK.
BY Whiteley and Ruckman
ATTORNEYS.

July 8, 1924.

J. A. HEIDBRINK 1,500,614

ANAESTHETIZING APPARATUS

Filed Nov. 17, 1921

6 Sheets-Sheet 3

INVENTOR:
JAY A. HEIDBRINK.
BY Whiteley and Ruckman
ATTORNEYS.

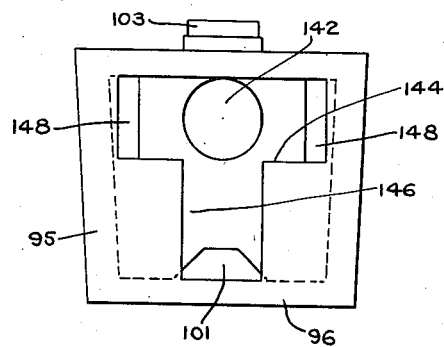
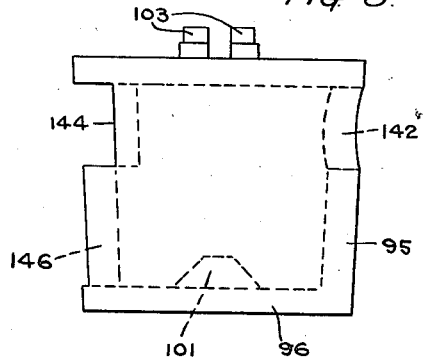
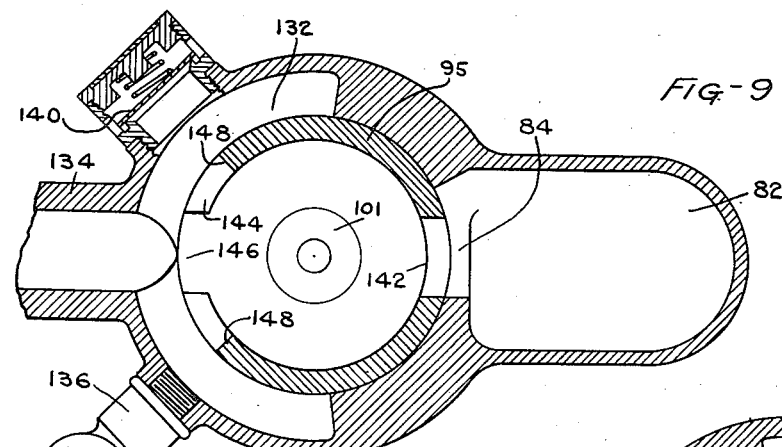
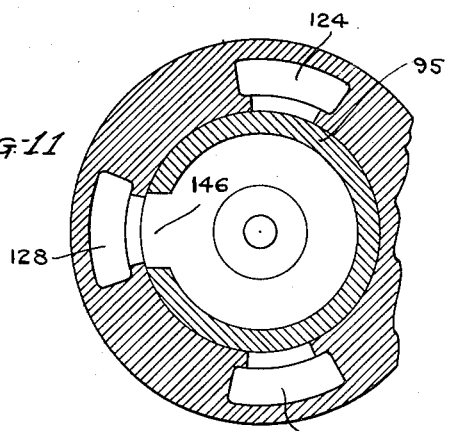
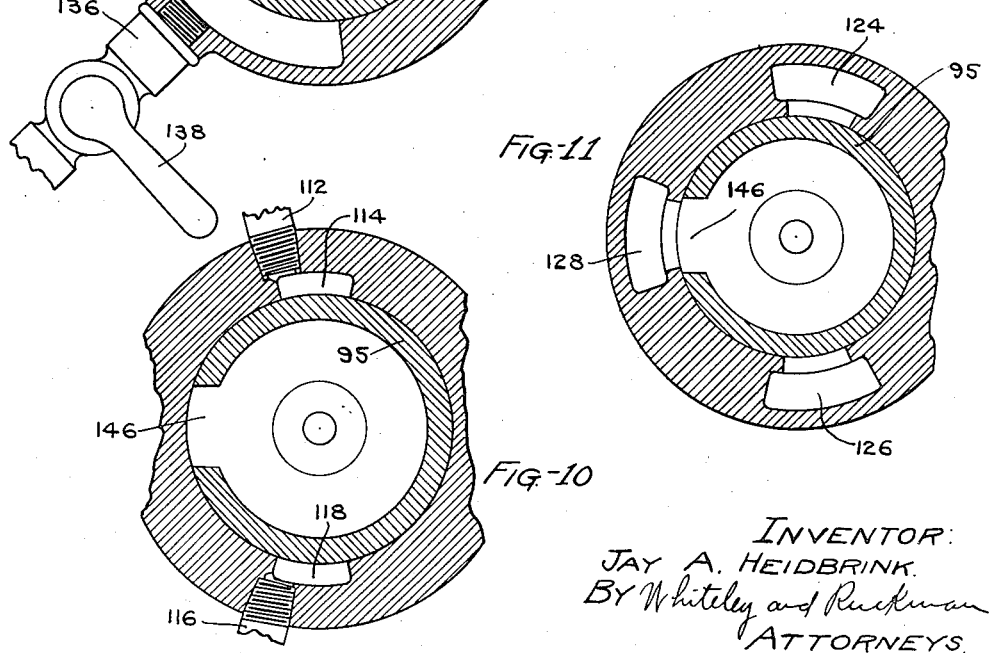

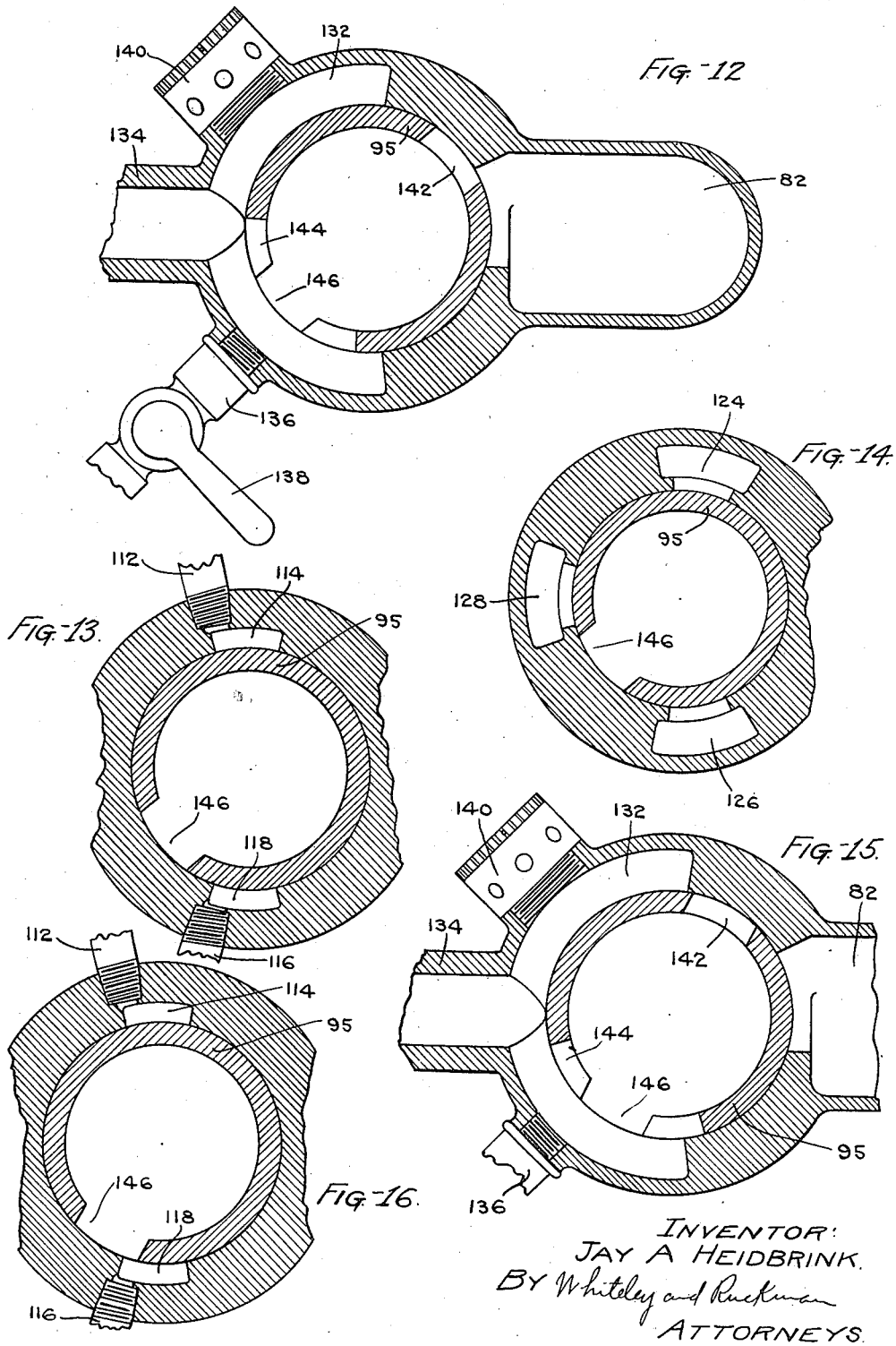

INVENTOR:
JAY A. HEIDBRINK.
BY Whiteley and Ruckman
ATTORNEYS.

Patented July 8, 1924.

1,500,614

UNITED STATES PATENT OFFICE.

JAY A. HEIDBRINK, OF MINNEAPOLIS, MINNESOTA.

ANÆSTHETIZING APPARATUS.

Application filed November 17, 1921. Serial No. 515,782.

*To all whom it may concern:*

Be it known that I, JAY A. HEIDBRINK, a citizen of the United States, residing at Minneapolis, in the county of Hennepin and State of Minnesota, have invented certain new and useful Improvements in Anæsthetizing Apparatus, of which the following is a specification.

My invention relates to anæsthetizing apparatus, and an object in general is to provide an improved apparatus for delivering gases to be used as an anæsthetic. An object in particular is to provide means whereby a plurality of gases, such as nitrous-oxid and oxygen may be readily delivered from independent sources of supply in the following different ways:

1. A properly proportioned nitrousoxid-oxygen mixture may be delivered to a gas-bag and to an inhaler.

2. A properly proportioned nitrousoxid-oxygen mixture may be delivered to the inhaler without any of the mixture passing into the gas bag.

3. Pure nitrousoxid may be delivered to the gas-bag and to the inhaler.

4. Pure nitrousoxid may be delivered to the inhaler without any of it passing into the gas-bag.

5. Pure oxygen may be delivered to the gas-bag and to the inhaler.

6. Pure oxygen may be delivered to the inhaler without any passing into the gas bag.

Another object is to provide means for delivering gases in the above mentioned ways in combination with means for controlling and registering the pressure under which the gases are delivered.

The full objects and advantages of my invention will appear in connection with the detailed description, and the novel features embodied in my inventive idea will be particularly pointed out in the claims.

In the accompanying drawings which illustrate one of the embodiments which my invention may assume,—

Figure 1:
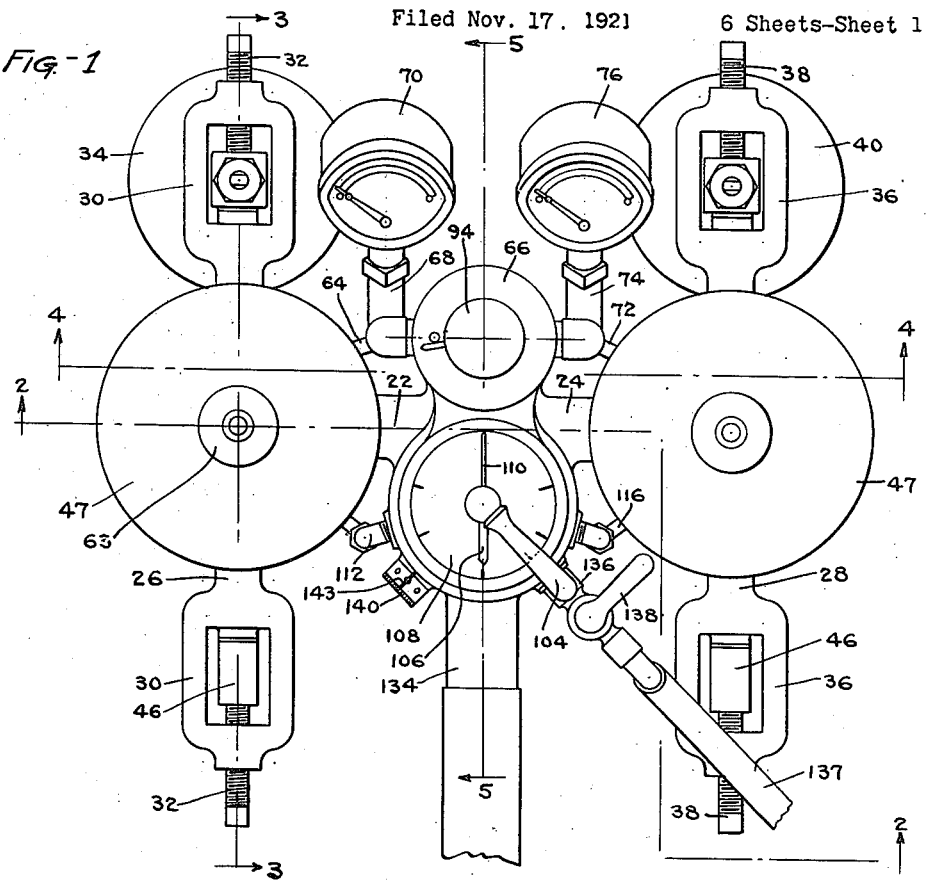
Figure 2:
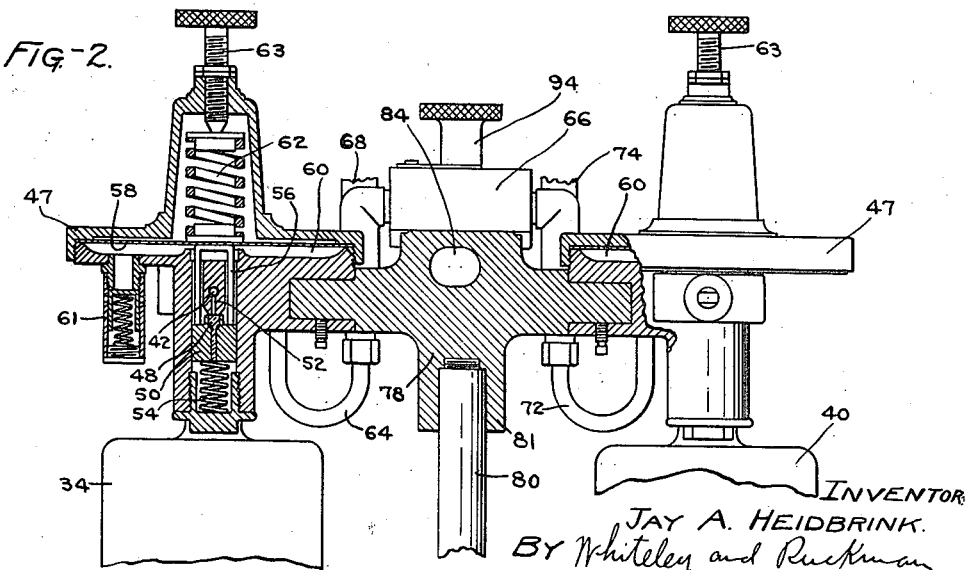
Figure 3:
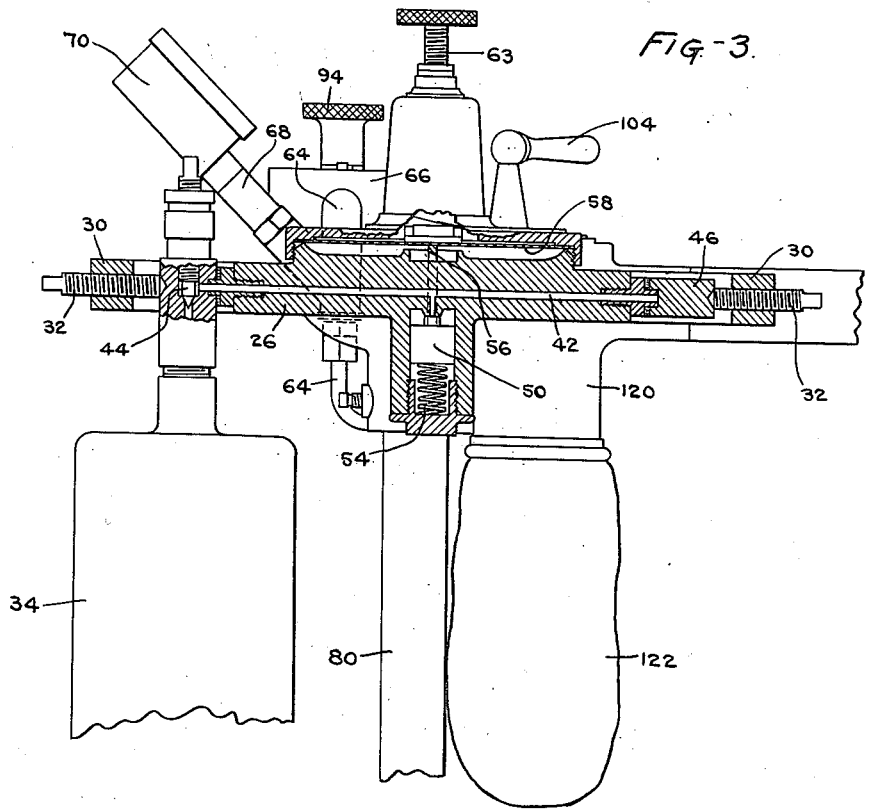
Figure 4:
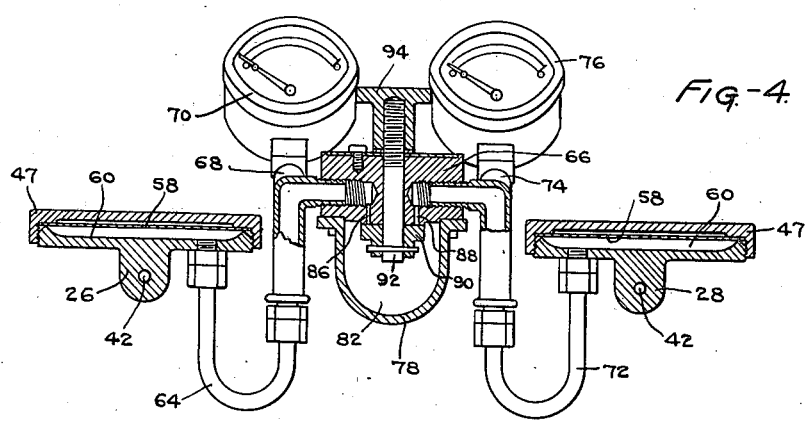
Figure 5:
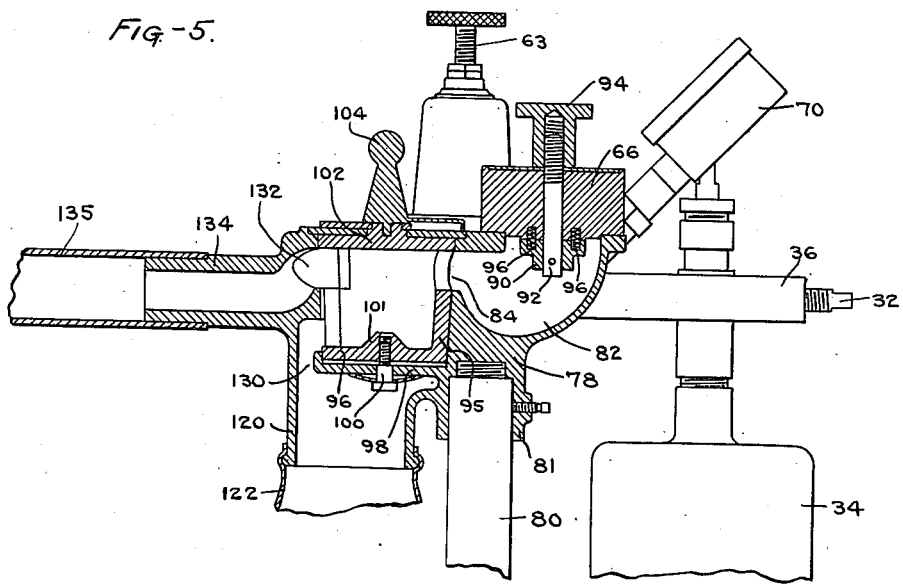
Figure 6:
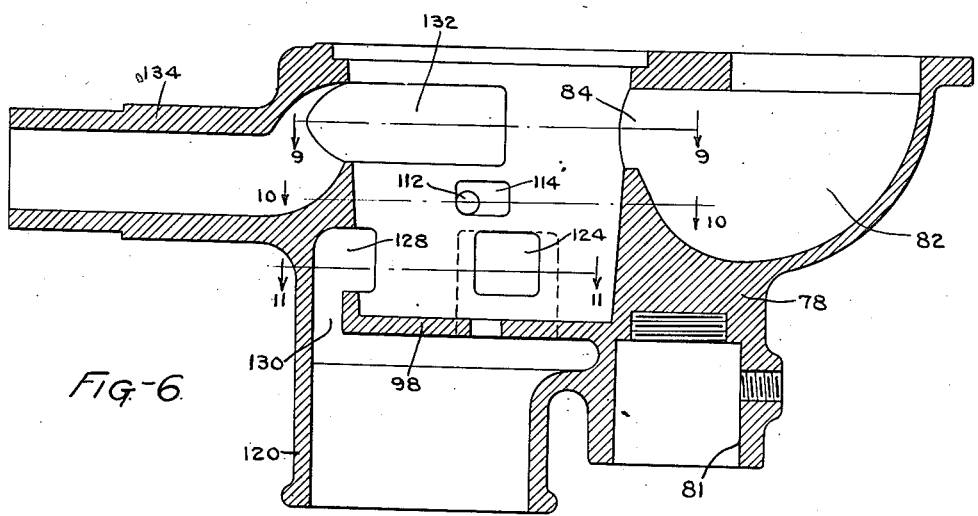
Figure 17:
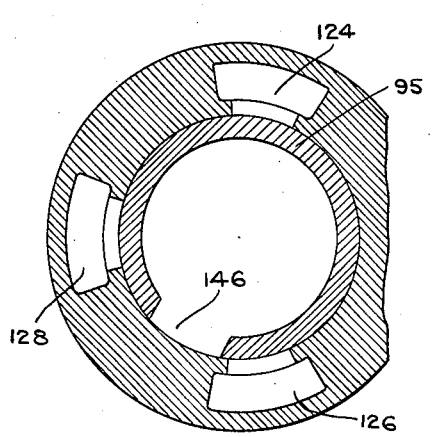
Figure 18:
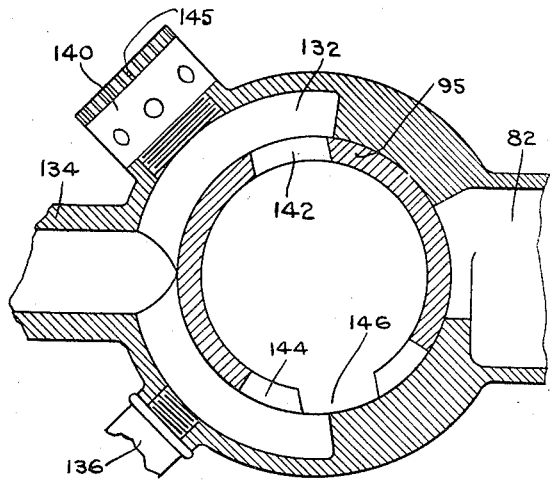
Figure 19:
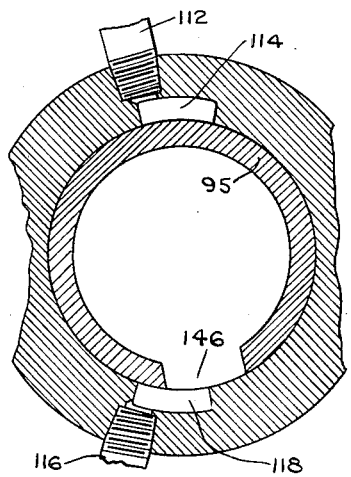
Figure 20:
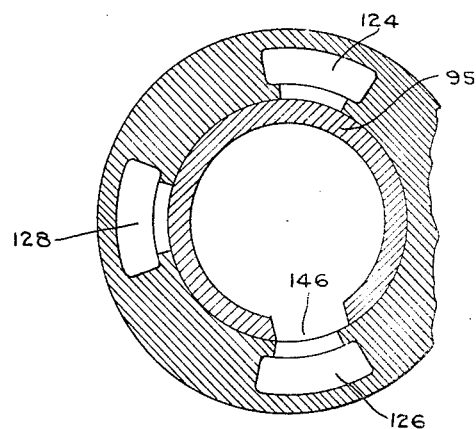
Figure 21:
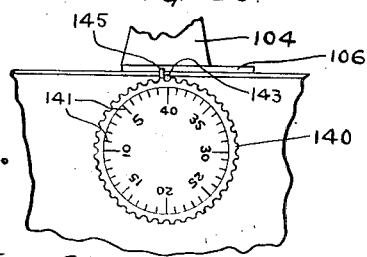

Fig. 1 is a top plan view of an anæsthetizing apparatus. Fig. 2 is a view mostly in vertical section on the line 2—2 of Fig. 1. Fig. 3 is a view mostly in vertical section on the line 3—3 of Fig. 1. Fig. 4 is a view mostly in vertical section on the line 4—4 of Fig. 1. Fig. 5 is a view mostly in vertical section on the line 5—5 of Fig. 1. Fig. 6 is a view in section of a casting detached from the other parts of the apparatus in connection with which it is shown in Fig. 5. Fig. 7 is a front elevational view of a rotatable valve. Fig. 8 is a side elevational view of the valve shown in Fig. 7. Figs. 9, 10, and 11 are views in horizontal section taken respectively on the lines 9—9, 10—10, and 11—11 of Fig. 6 but with the rotatable valve in place in the casting, and so positioned as to permit passage of a mixture of the two gases to a gas-bag and to an inhaler. Figs. 12, 13, and 14 are similar sections with the rotatable valve so positioned as to close communication with the gas-bag and to allow the mixed gases to pass to the inhaler. Figs. 15, 16 and 17 are similar sections with the rotatable valve so positioned as to close communication with the gas-bag and to allow passage of pure nitrousoxid to the inhaler. Figs. 18, 19 and 20 are similar sections with the rotatable valve so positioned as to permit passage of pure nitrousoxid to the gas-bag and to the inhaler. Fig. 21 is a view of a safety valve.

As shown in the drawings, there are a pair of arms 22 and 24 supported in suitable manner which carry the crossbars 26 and 28 respectively. The ends of the crossbar 26 are provided with yokes 30 within which the heads of the gas containers are adapted to be secured by screws 32. The gas containers which are attached to the yokes 30 are intended for holding oxygen and one of them is designated by the numeral 34. The ends of the crossbar 28 are provided with yokes 36 within which the heads of gas containers are adapted to be secured by screws 38. The gas containers attached to these latter yokes are intended for holding nitrousoxid and one of them is designated by the numeral 40. Each of the cross arms 26 and 28 contains a passageway 42 such as that shown in Fig. 3 with which the gas containers are adapted to be placed in communication by means of needle valves 44. Since the two sides of the apparatus which control the supply of nitrousoxid and oxygen are alike, a detailed description of one side may be considered as applicable to the other side. Either end of the passageway 42 may be closed by means of a plug 46 when a gas container is not attached to such end. As will be seen from Fig. 2, the passageway 42 is provided with a pressure controlling device 47 within which a fiber plug 48 held in a slidable block 50 is adapted to engage the outlet end of a hole 52 extending down from the passageway 42. The block 50 is held upwardly by a spring 54 and this block may be depressed by means of a staplelike member 56, the upper end of which is engaged by the lower surface of a diaphragm 58 contained in a chamber 60. This chamber is shown provided with a safety valve 61. A spring 62 rests upon the upper surface of the diaphragm and the tension of the spring may be regulated by a screw 63.

From the chamber 60 at one side of the apparatus, the oxygen passes through a tube 64 to a valve head 66, this tube being connected by a tube 68 with a pressure guage 70 for indicating the pressure at which the oxygen is delivered. From the chamber 60 which is at the other side of the apparatus, the nitrousoxid passes through a tube 72 to the valve head 66, the tube 72 being connected by a tube 74 with a pressure guage 76 for indicating the pressure at which the nitrousoxid is delivered. The valve head 66 is secured over an opening in a casting 78 which is attached to the upper end of a standard 80 by means of a socket 81 in the casting. The rear portion of the casting 78 is hollow to form a mixing chamber 82 having an outlet opening 84. As shown in Fig. 4, an aperture 86 extends from the tube 64 through the valve head 66 and an aperture 88 extends from the tube 72 through the valve head. As shown, the aperture 86 for oxygen is smaller than the aperture 88 for nitrousoxid and it will be understood that by properly proportioning these apertures the percentages of gases in the mixture may be determined. The passage of gases through these apertures into the mixing chamber 82 is brought about or stopped at will by means of a disk valve 90 which is secured to the lower end of a stem 92 slidably mounted in the head 66. The upper end of this stem is threaded to receive a thumb nut 94 which may be turned so as to cause the valve 90 to close the apertures or to open them to the desired extent. Springs 96 interposed between the head 66 and the valve 90 serve to hold the latter open to the extent which is permitted by the position of the nut 94. The forward portion of the casting 78 is hollow to form a valve casing for receiving a hollow rotatable valve 95 having a bottom wall 96 which rests upon a shelf 98 and is attached for rotation thereon by a screw bolt 100 which threads into a boss 101 within the bottom wall of the valve. This valve is provided with a top wall 102 having an upward split projection 103 to which is attached a handle 104 for rotating the valve. The stem portion of the handle carries a pointer 106 adapted to register with marks on a dial 108 as shown in Fig. 1 for indicating the position of the valve. A wire 110 is also carried by the stem of the handle and the outer end of this wire is downwardly turned so as to engage notches on the valve casing when the pointer is in line with the various marks. As shown in Figs. 1 and 10, the oxygen chamber 60 is connected by a tube 112 with a recess 114 in the valve casing and the nitrousoxid chamber 60 is connected by a tube 116 with a recess 118 in the valve casing. The valve casing has a downward tubular extension 120 over which the neck of a gas-holding and rebreathing bag 122 is adapted to fit as shown in Figs. 3 and 5. The interior wall of the valve casing is provided with diametrically opposite apertures 124 and 126 and a front aperture 128, these apertures being toward the lower portion of the casing and opening downwardly through passages such as the passage 130 shown in Fig. 6 so as to establish communication with the bag 122. As will be apparent from Fig. 6, the apertures 124 and 126 partially overlap the recesses 114 and 118, respectively. The interior wall of the valve casing at its upper portion is provided with an elongated arcuate recess 132 which extends for a little more than the semi-circumference. Extending forwardly from the valve casing at the center of the recess 132 is a hollow projection 134 adapted to be connected by tubing 135 with an inhaling device such as a nasal inhaler. Also extending from the recess 132 is a hollow projection 136 adapted to be connected by tubing 137 with another inhaling device such as a mouth inhaler. The projection 136 is shown provided with a shut-off cock 138. Also connected with the recess 132 is a safety valve 140. As will be apparent from Fig. 9, this valve includes a spring-pressed disk and the tension on this disk may be varied by turning a screw threaded member which has a dial provided with graduations 141 as shown in Fig. 21. These graduations are arranged to indicate from a minimum of 1 up to a maximum of 40, corresponding to pressure determined by the number of millimeters in height of a column of mercury. The rotatable part of the valve has notches in its periphery corresponding to the graduations 141, and an indicating finger 143 secured to the valve casing as shown in Fig. 1 is engageable with any one of the notches. A projection 145 on the rotatable part of the valve, by engagement with the finger 143, serves to prevent rotation in one direction beyond the number 1 and in the other direction beyond the number 40. The peripheral wall of the rotatable valve 95 is provided with a circular port 142 which can be made to register with the outlet opening 84 of the mixing chamber. The opposite side of the peripheral wall of this valve is provided with a T-shaped opening which forms a horizontal port 144 joining with a lower vertical port 146. As will be apparent from Figs. 7 and 9, the end walls 148 of the port 144 are cut radially with relation to the center of the valve.

With the above description of details of construction in mind, the operation of the apparatus and especially of the rotatable valve will be readily understood. When the rotatable valve is in the position shown in Figs. 9, 10, and 11, the mixture of oxygen and nitrousoxid will pass from the mixing chamber 82 through the port 142 into the interior of the valve and through the port 144 into the recess 132 which communicates at the same time with the tube 134, the tube 136 and the safety valve 140. The mixture will also pass through the port 146 into the aperture 128 and down into the gas-bag 122. When the rotatable valve is in the position shown in Figs. 12, 13 and 14, the mixture of gases will pass from the mixing chamber 82 through the port 142 and the port 144 into the recess 132 communicating with the inhaler, but, as will be seen from Fig. 14, the port 146 is now closed and the gases cannot pass into the gas-bag 122. When the rotatable valve is in the position shown in Figs. 15, 16, and 17, the port 142 is closed, and hence, the mixture of gases cannot pass into and through this valve. However, pure nitrousoxid will pass from the tube 116 and the recess 118 through the port 146 into the interior of the rotatable valve, and then into the recess 132 for delivery through tubes 134 and 136, while at the same time communication with the bag 122 will be closed as is apparent from Fig. 17. When the rotatable valve is in the position shown in Figs. 18, 19, and 20, pure nitrousoxid will pass from the tube 116 and the recess 118 into the interior of the rotatable valve and then into the recess 132 for delivery through the tubes 134 and 136, while communication with the gas-bag will be open through the port 146 and the aperture 126. When the ports of the rotatable valve 95 occupy positions corresponding to those shown in Figs. 15, 16 and 17 but with the port 146 in register with the recess 114 instead of in register with the recess 118, then pure oxygen will be delivered to the inhaler and communication with the bag 122 will be closed. When the ports of the rotatable valve occupy positions corresponding to those shown in Figs. 18, 19 and 20, but with the port 146 in register with the recess 114 and the aperture 124 instead of in register with the recess 118 and apertures 126 then pure oxygen will pass both to the inhaler and to the bag 122. The purpose of the safety valve 140 is to limit the pressure supplied to the inhaler so as to prevent rupturing the lungs of the patient. If desired, this valve can be set so as to reduce the pressure below the safety point, since, as previously explained, it may be set to open when the dial indicates any number between 1 and 40. The setting of the valve thus serves to indicate to the operator a maximum pressure of the gas which may be supplied to the lungs of the patient.

I claim:

1. An anæsthetizing apparatus having a mixing chamber, means for supplying thereto from independent sources of supply a plurality of gases under pressure, an inhaler, a gas-bag adapted to communicate with and be shut off from said inhaler and said mixing chamber, and a single shiftable valve whereby the mixed gases may be delivered to said inhaler alone or to both said inhaler and said gas-bag.

2. An anæsthetizing apparatus having a mixing chamber, means for supplying thereto from independent sources of supply a plurality of gases under pressure, an inhaler, means whereby the mixed gases may be delivered to or shut off from said inhaler, a gas bag adapted to be connected with and shut-off from said inhaler and said mixing chamber, and a single shiftable valve whereby gas from one of said sources may be delivered separately to said inhaler alone or to both said inhaler and said gas-bag.

3. An anæsthetizing apparatus having a mixing chamber, means for supplying thereto from independent sources of supply a plurality of gases under pressure, an inhaler, means whereby the mixed gases may be delivered to or shut off from said inhaler, a gas-bag adapted to be connected with and shut-off from said inhaler and said mixing chamber, and a single shiftable valve whereby gas from any one of said sources may be delivered separately to said inhaler alone or to both said inhaler and said gas bag.

4. An anæsthetizing apparatus having a mixing chamber, means for supplying thereto from independent sources of supply a plurality of gases under pressure, devices for controlling the pressure at which each of the gases passes from said sources of supply, an inhaler, and a single shiftable valve whereby the mixed gases may be delivered to or shut off from said inhaler, and whereby gas passing through any one of said controlling devices may be delivered separately to said inhaler.

5. An anæsthetizing apparatus having a mixing chamber, means for supplying thereto from independent sources of supply a plurality of gases under pressure, an inhaler, a valve casing interposed between said mixing chamber and said inhaler, a single rotatable valve in said valve casing, said valve having ports through which the mixed gases may be delivered to said inhaler, and means connecting said sources of gas supply respectively with recesses in said valve casing, said ports being so arranged that said valve may be positioned so as to cut off the delivery of mixed gases from said mixing chamber, and at the same time provide for delivery of gas from any one of said sources to said inhaler.

6. An anæsthetizing apparatus having a mixing chamber, means for supplying thereto from independent sources of supply a plurality of gases under pressure, an inhaler, a gas bag adapted to communicate with and be shut off from said inhaler and said mixing chamber, a valve casing interposed between said mixing chamber and said inhaler, a single rotatable valve in said valve casing, said valve having ports through which the mixed gases may be delivered to said inhaler alone or to both said inhaler and said gas-bag, and tubes connecting said sources of gas supply respectively with recesses in said valve casing, said ports being so arranged that said valve may be positioned so as to cut off the delivery of mixed gases from said mixing chamber and at the same time provide for delivery of gas from any one of said recesses to said inhaler alone or to both said inhaler and said gas bag.

7. An anæsthetizing apparatus having a mixing chamber, means for supplying thereto from independent sources of supply, a plurality of gases under pressure, an inhaler, a valve casing interposed between said mixing chamber and said inhaler, a hollow projection extending from said valve casing for providing a connection with said inhaler, an arcuate recess in said valve casing communicating with said hollow projection, a tubular extension on the lower portion of said casing, a gas-bag attached to said tubular extension, a hollow rotatable valve mounted in said valve casing, said valve having a port adapted to register with an outlet from said mixing chamber and having a T-shaped opening in its wall opposite said port, the upper part of said opening forming a port communicating with said arcuate recess and the lower part of said opening forming a port adapted to communicate with an aperture in said valve casing leading to said gas-bag or to communicate with internal recesses in said valve casing or to communicate both with said internal recesses and adjacent apertures in said valve casing leading into said gas-bag, and tubes connecting said independent sources of gas supply respectively with said internal recesses.

In testimony whereof I hereunto affix my signature.

JAY A. HEIDBRINK.